(12) United States Patent
Mack

(10) Patent No.: US 6,568,940 B2
(45) Date of Patent: May 27, 2003

(54) EQUESTRIAN TRAINING METHOD

(76) Inventor: Maureen Mack, 38 Crine Rd., Morganville, NJ (US) 07741

( * ) Notice: Subject to any disclaimer, the term of this patent is extended or adjusted under 35 U.S.C. 154(b) by 0 days.

(21) Appl. No.: 09/960,929

(22) Filed: Sep. 25, 2001

(65) Prior Publication Data

US 2003/0059753 A1 Mar. 27, 2003

(51) Int. Cl.$^7$ ................................................ A63B 69/04
(52) U.S. Cl. ........................ 434/247; 119/712; 54/46.1
(58) Field of Search ................................ 434/247, 255, 434/256, 257; 119/712, 769, 795, 856; 54/46.1, 47, 49, 49.5, 23, 87, 44.1, 71

(56) References Cited

U.S. PATENT DOCUMENTS

| | | |
|---|---|---|
| 43,300 A | 6/1864 | Fichter |
| 2,153,326 A | 4/1939 | Crouter |
| 3,672,075 A * | 6/1972 | Eikelenboom ............... 434/247 |
| 4,190,968 A | 3/1980 | Clapp et al. |
| 4,531,346 A * | 7/1985 | Brown ......................... 54/46.1 |
| 4,905,458 A * | 3/1990 | Johnston et al. ................ 54/23 |
| 4,957,444 A * | 9/1990 | Armen ......................... 434/247 |
| 5,154,042 A * | 10/1992 | Mooney ....................... 54/46.1 |
| 5,802,822 A * | 9/1998 | Holzhauser .................. 54/46.1 |
| 5,901,531 A * | 5/1999 | Rogers ......................... 54/44.1 |
| 6,095,819 A * | 8/2000 | Ferrand et al. ............. 434/247 |

FOREIGN PATENT DOCUMENTS

| | | |
|---|---|---|
| GB | 25611 | 12/1899 |
| GB | 23513 | 11/1908 |

* cited by examiner

*Primary Examiner*—Kien T. Nguyen
(74) *Attorney, Agent, or Firm*—Bradford E. Kile; Kile Goekjian Lerner & Reed PLLC

(57) ABSTRACT

The present invention is directed to a novel method and apparatus for equestrian training wherein a finely adjustable strap is provided with an English saddle girth engaging portion and opposite end Velcro cooperating portions on opposite sides of the strap and is operable to be trained through an English saddle stirrup or around the saddle stirrup leathers to maintain the stirrup is a proper position for a given horse and rider.

6 Claims, 3 Drawing Sheets

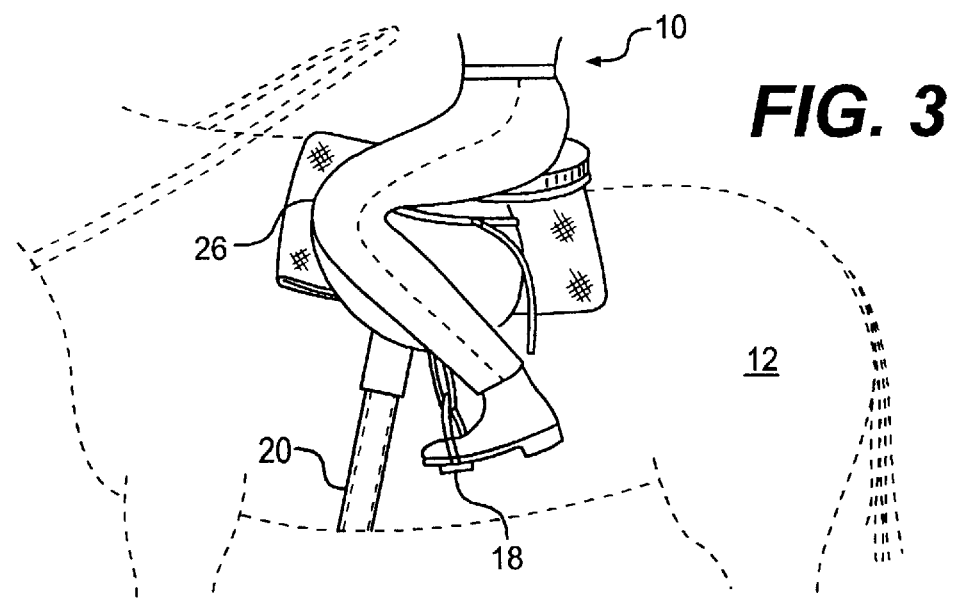
FIG. 3
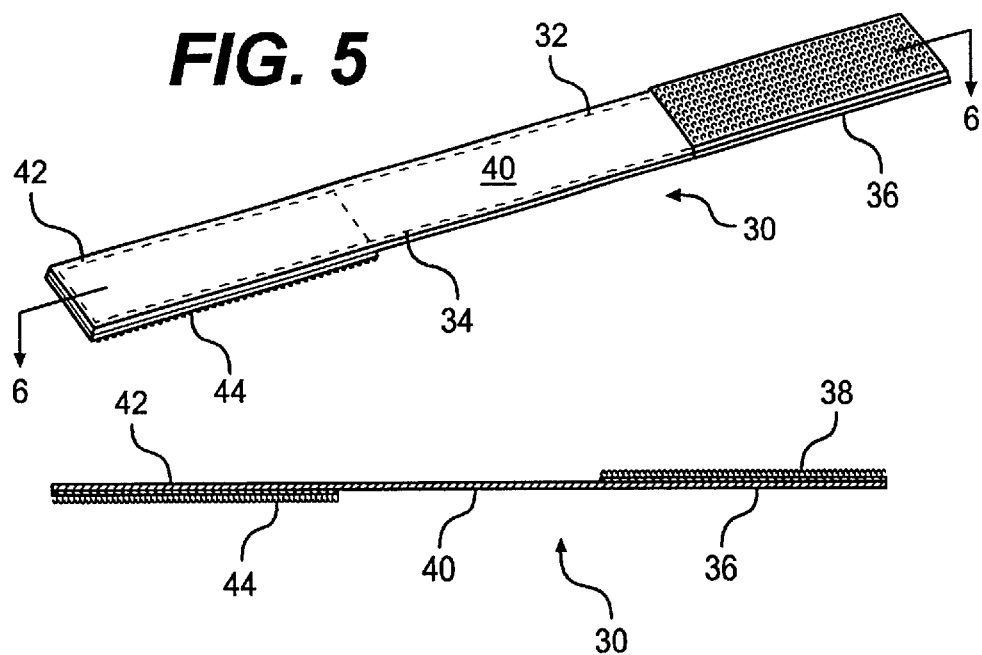
FIG. 5
FIG. 6

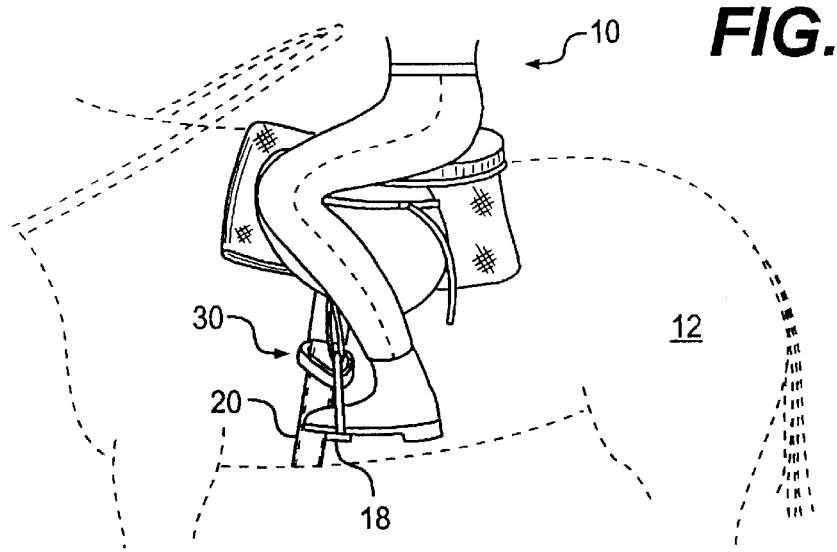
FIG. 9
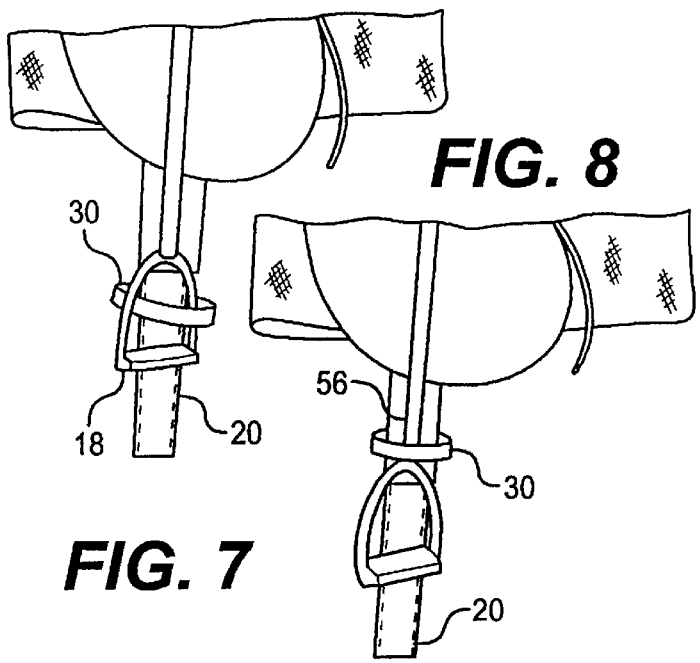
FIG. 8
FIG. 7
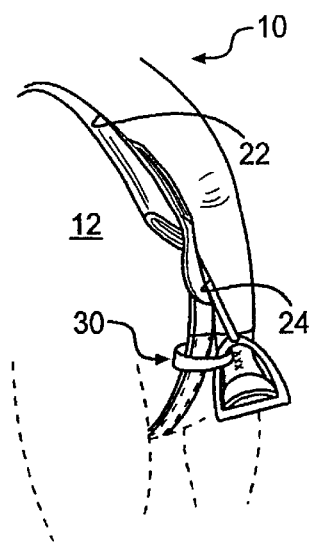
FIG. 10

EQUESTRIAN TRAINING METHOD

BACKGROUND OF THE INVENTION

This invention relates to a novel training method and apparatus for equestrian riding. More specifically, the present invention is directed to a method and apparatus for training a rider to maintain proper position and seat while riding with an English saddle.

Riding a horse with an English saddle is not similar, in any respect, to the experience we enjoyed as children of merely sitting in a Western saddle on a ring pony and allowing the pony to be lead around in circles. Rather riding on a English saddle with a full grown horse is more of a cooperative athletic experience between horse and rider regardless of the horse's gait of walking, trotting, cantering or galloping.

In order to be an effective rider, and work in cooperation with a horse, a rider must have knowledge of proper position and train his or her leg muscles to respond in concert with movement of the horse. An interface between a horse and rider is a saddle. There are basically two saddle types. A Western saddle is a rather heavy and stiff saddle with a wide seat, high pommel, saddle horn and relatively heavy stirrups. By comparison an English saddle has a relatively narrow seat, low pommel, thin side flaps, narrow and flexible stirrup leathers and light stirrup irons. An English saddle is more like riding bareback than with a Western saddle and requires more emphasis on being properly positioned on the horse. If a rider has her center of gravity over the balls of her feet and is sitting tall and erect and moving with the flow of the horse the riding experience is a unified athletic effort between horse and rider. On the other hand if a rider is tilted or heavy on one side, is pushing her heals too far forward or outward and is working at cross purposes with the horse it becomes a struggle for both horse and rider. While a horse is far stronger than a rider, and to some extent overrides whatever a novice rider does, an improper seat and posture, can throw a horse off stride and in effect work against the natural motion of the horse which is tiring and awkward form both the horse and rider. This invention is directed to a method and training aid for teaching a proper riding position with an English saddle to provide a rider with a proper "feel" of the horse and to train leg muscles in the proper position of horseback riding.

In a preferred riding posture the rider sits squarely to the front of the saddle with approximately four fingers from the end of the saddle cantle to the rider's seat. A riders leg muscles should be relaxed so that the flat part of the inside thigh, the inside knee and the upper calf are close to the saddle. The rider's feet should be in a generally flat position pointing straight ahead. The ball of the foot should be placed in the strip iron as the arch is too weak to support a rider during riding. The toes should not point either in or out and the heels should not be pushed away from the side of the horse.

The above position, while easy enough to verbally convey to a student, and to initially position when a horse is standing still, it is difficult for a novice rider to sustain a proper position as the horse begins to move and to canter or gallop and a new rider's mind becomes distracted or focused on other matters. Moreover, since the horse is moving away from the trainer it is difficult to accurately convey to the rider adjustments that are necessary to correct a seat that has drifted into an improper position. Still further, if multiple riders are in a ring at one time, it is difficult for an instructor to see all riders' positions simultaneously.

At least one previously known equestrian riding aid comprises a belt operable to be worn around a rider's waist with leather heel loops and an adjustable elastomeric loop between the belt and the heel loops. Although this device is designed to provide a rider with an elastomeric connection between his hips and feet, on both sides of the horse, to assist in balance it is an unnatural attachment to the rider's body. It would therefore be highly desirable to provide a method and apparatus for rider leg and boot position training that would not be worn, per se, by the rider.

Additionally, it would be desirable to provide a method and apparatus for rider position training, which is finely adaptable to different rider and horse body configurations as a large variety of rider and horse sizes are common in any class. It would be desirable to permit a riding instructor to properly position a rider and then insure that the rider will be able to maintain that position as the horse begins to walk and canter away from the immediate vicinity of the instructor. The old pedagogical axiom that practice does not make perfect it makes permanent is applicable to horseback riding as in other athletic endeavors. Only perfect practice makes perfect. Improper and unbalanced techniques, once acquired, are difficult to overcome. It is also essential in any training aid to maintain at least the same level of safety that a rider would normally encounter. Accordingly, it is completely unacceptable to bind a rider's leg to a horse or saddle, in a proper position, as it may become necessary to dismount at a moments notice.

The difficulties and limitations suggested in the preceding are not intended to be exhaustive, but rather are among many which demonstrate that equestrian training methods and apparatus appearing in the past will admit to worthwhile improvement.

OBJECTS OF THE INVENTION

It is a general object of the invention to provide a novel equestrian training method and apparatus that will obviate or minimize problems and achieve desired advantages of the type previously described.

It is another general object of the invention to provide a method and apparatus for reliability training a rider to acquire and maintain a proper cooperation with a horse while riding to create a unified athletic experience.

It is a further general object of the invention to provide a method and apparatus for equestrian training that is safe and efficient as a training technique.

It is a specific object of the invention to provide a novel equestrian method and apparatus that will facilitate proper rider position with respect to a mount.

It is a further object of the invention to provide a novel method and apparatus for equestrian training that remains functional even when a rider and horse are away from an immediate location of an instructor.

It is yet another object of the invention to provide a novel method and apparatus that will reliably train a rider's thigh and calf muscles to feel the proper position and cooperation with a mount.

It is yet a further object of the invention to provide a novel method and apparatus that will insure proper position training for a rider so that a rider's leg muscles train and develop in a proper way.

It is yet another object of the invention to provide a novel method and apparatus that can be finely adjusted to individual riders and horses regardless of size and physique.

It is still a further object of the invention to provide a novel method and apparatus that will insure proper equestrian training without being worn by a rider.

BRIEF SUMMARY OF A PREFERRED EMBODIMENT OF THE INVENTION

A preferred embodiment of the invention, which is intended to accomplish at least some of the foregoing objects, includes a finely adjustable riding aid comprising a strap with a girth engaging portion and two end portions with male and female Velcro surfaces. The rider's training device is positioned beneath a saddle girth at the side of a horse and then connected through a stirrup iron or around an English saddle stirrup leather to maintain a proper position of the stirrup iron with respect to the side of a horse.

BRIEF DESCRIPTION OF THE DRAWINGS

Other objects and advantages of the present invention will become apparent from the following detailed description of preferred embodiments thereof taken in conjunction with the accompanying drawings, wherein:

FIG. 3 is a side view of the novice rider shown in FIG. 1, however, in this view the rider's leg and boot is pulled back too far to maintain contact with the side of a horse;

FIG. 5 is a perspective view of a unique, finely variable positioning device comprising a strap divided generally into thirds and having a Velcro hook strip on one end an a loop Velcro strip on the other end in accordance with a preferred embodiment of the invention;

FIG. 6 is a cross-sectional view of the finely variable, position training device depicted in FIG. 5 taken along section lines 6—6 in FIG. 5;

FIG. 7 is a partial side view of the subject equestrian training device mounted around a stirrup iron and the girth of an English saddle;

FIG. 8 is a partial side view of the subject equestrian training device mounted around the stirrup iron leather and girth of an English saddle;

FIG. 9 is a partial, side view of a rider and mount with the subject equestrian training device operably mounted in the position depicted in FIG. 7; and FIG. 10 is a partial front view of the rider, mount and training device depicted in FIG. 9.

DETAILED DESCRIPTION

Context of the Invention

As stated above, the subject invention is directed to an equestrian method and apparatus for facilely training a rider to obtain and maintain a proper seat on a horse and to train a rider's inner thigh and calf muscles in a proper position. As noted above it is only perfect practice that will be of any benefit to someone wanting to learn to properly ride a horse. Before discussing the subject method and apparatus to achieve the desired results, it is believed to be of some benefit to outline the context of the invention or some of the more common errors that novice riders find difficult to avoid.

Figure 1:
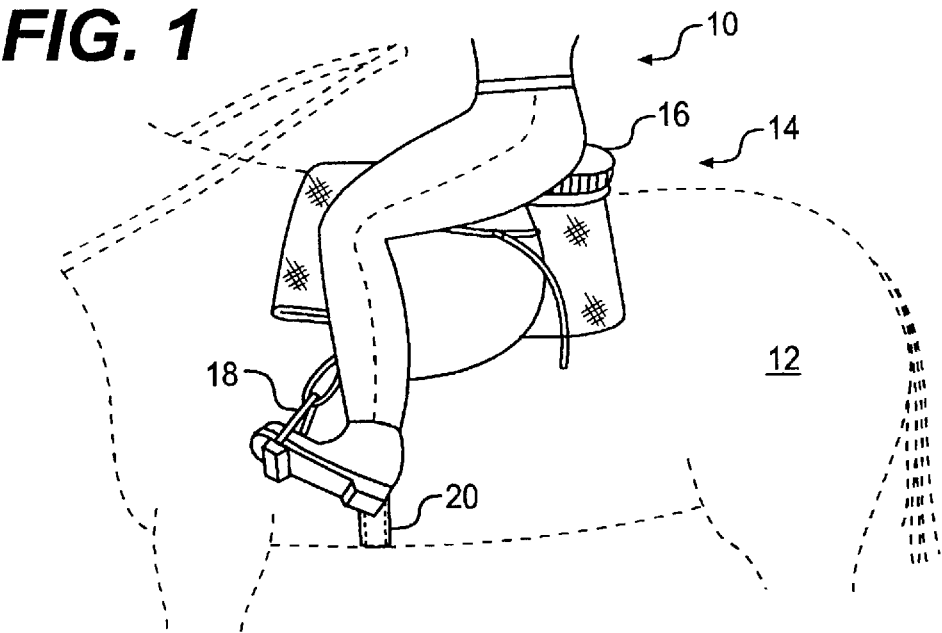
FIG. 1 is a side view of a novice rider mounted on a horse with her seat too far back and her boots and legs too far forward.
Figure 2:
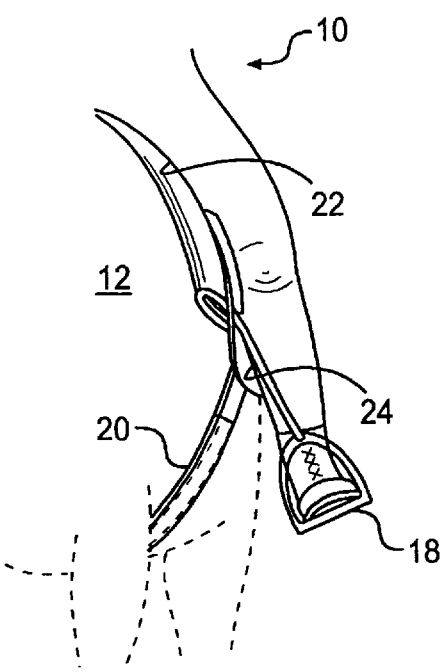
FIG. 2 is a partial front view of the rider depicted in FIG. 1 showing that the rider's boot is also extending too far outwardly from the side of the horse for good calf contact and control.

FIGS. 1 and 2 illustrate one example of a common riding error. In these figures a partial silhouette of a rider 10 is shown positioned upon a horse 12. The rider is using a standard English saddle 14. As shown, the rider's seat is too far back toward the saddle cantle 16 and the stirrup iron 18 is extended forward, at an acute angle, with respect to the saddle girth 20. In this position the rider is tending to fall backward, pulling hard on the reins and fighting with the horse just to keep her balance. Rather than providing control, this technique often induces the horse to exhibit erratic behavior. In addition to having her weight too far back the rider, as shown in FIG. 2, has her feet splayed outwards from the side of the horse. In this position it is not possible to use the rider's inner thighs 22 and calves 24 to grip and control the horse.

Figure 4:
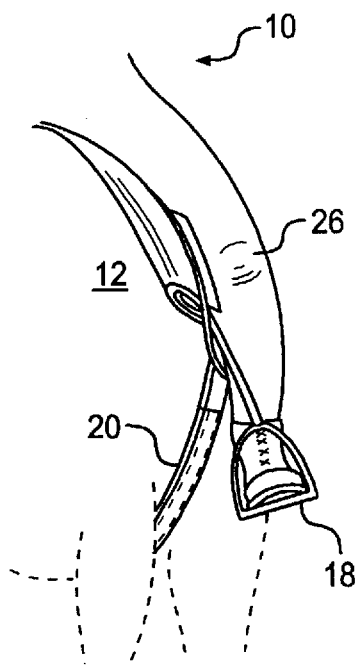
FIG. 4 is a partial front view of the rider depicted in FIG. 3 which depicts a better position than the rider's boot in FIG. 2 but is still too far away from the side of the horse.

Another flawed, but equally common, riding position is depicted in FIGS. 3 (note sheet 2) and 4. In this position the rider's knees 26 are too far forward and the stirrup iron is pushed too far behind the saddle girth 20. In addition, as noted in FIG. 4, the rider's feet are too far away from the side of the horse Either of the above positions can unbalance the horse and interfere with the horse's natural gait as well as making the rider's experience unpleasant. In a proper position a rider sits squarely toward the front of the saddle with approximately four fingers space between the rider's seat and the cantle of the saddle. A rider's leg muscles should be relaxed so that the flat part of the thigh, the inside of the knee and the upper calf are close to the saddle. The rider's feet should be pointed straight forward and the ball of the rider's foot should be positioned upon the stirrup iron. The center of gravity of the rider should be over the stirrup irons so that the rider's body is not falling forward or backward and can be supported through the ball of the rider's foot.

When a horse and rider are at rest and standing stationary within a riding ring it is possible for an instructor to physically position the rider's legs and feet in a correct position for his unique body configuration and with respect to the particular horse. However, riding is not a stationary activity. The horse begins to move, a rider can loose his balance and a novice easily forgets the proper riding posture. The subject invention facilely enables an instructor to initially position a rider with respect to a particular horse and then assist the rider to maintain the proper position as the horse assumes various gates.

Equestrian Riding Trainer

FIGS. 5 and 6 disclose a unique equestrian training aid 30 in accordance with a preferred embodiment of the invention. The equestrian training aid 30 is preferably composed of a leather strap 32 of single or double thickness having stitched edges 34 for stability. The strap 32 is approximately 9 to 12 inches in length and is divided essentially into thirds. A first end 34 of the strap has a hook Velcro strip 36, comprising an array of hook elements, mounted onto the strap by stitching or by a permanent adhesive. A second or middle third of the strap 40 remains as a smooth leather strap member and is operable to be trained beneath a saddle girth without the horse being aware of its existence. The other end of the strap 42, again comprising essentially one third of the overall length of the strap 32, is fitted with a female Velcro strip 44 having a plurality of loops to interact and cooperate with the "J" shaped hooks of the male strip. The hoop Velcro strip 44 is mounted on the opposite side of the strap with respect to the Velcro strip 38.

In operation, and turning now to FIG. 7, for maximum control, the strap 30 is positioned beneath the girth 20 of a rider's saddle by an instructor with the loop side of the Velcro strip preferably facing the side of the horse. The instructor positions a rider in a proper riding position for the size of the horse and the rider, note FIGS. 9 and 10, and reversibly bends the Velcro strip 42 back approximately 180 degrees and through the stirrup iron. The instructor then bends the hook portion of the strap 30 over, again by 180 degrees, and into engagement with the loop portion to form an elliptical band extending around the girth of the saddle and through the stirrup iron. In this position, as seen in FIGS. 9 and 10 a rider's boot and leg can be started in a correct position. The correct initial position can be maintained as the horse moves away from the instructor's position because the saddle iron is essentially positioned in a fixed position relative to the saddle girth.

As the rider becomes more comfortable and her muscles on the inside of her thigh 22 and calf 24 are trained to feel the correct position and the sides of the horse, the instructor can loosen the strap 30, from a through the stirrup position, and move it up to a position around the stirrup leathers 50 as shown in FIG. 8. As the rider becomes proficient in this less restrictive position the instructor can move the strap up further of remove the strap 30 altogether.

SUMMARY OF MAJOR ADVANTAGES OF THE INVENTION

After reading and understanding the foregoing description of preferred embodiments of the invention, in conjunction with the illustrative drawings, it will be appreciated that several distinct advantages of the subject equestrian training aid are obtained.

The present invention presents numerous advantages over previously known systems designed to be worn by a rider. More specifically, the subject invention enables an instructor to position a rider's boot and leg in a proper position for the individual size of the rider and horse and finely adjust the rider's position by the infinitely variable ability to change the length of the loop formed by the strap 30 having Velcro end members. At the same time the rider is not bound to the horse or saddle and the subject method and apparatus permits a rider to dismount at a moments notice.

The division of the strap 30 into thirds enables a smooth portion of the strap to slide under the horses girth so that the horse is not aware that a training aid is being utilized.

The subject training aid enables the instructor to variably adjust the tightness of the loop and the position of the loop from around the girth and stirrup iron to around the girth and stirrup leathers and finally completely off of the saddle as the rider becomes more proficient and acquires the feel of the proper position during various gaits of the horse.

The training aid of the invention is not mounted on either the horse or rider and thus neither is aware of its use other than the fact that the rider's legs and boots are maintained in a correct riding position until the rider's feel for the riding experience is learned.

The foregoing preferred and alternative embodiments of the invention, and advantages of the invention, are not intended to be exhaustive but rather are illustrative of the invention and should not be construed to be limitations on the invention as defined in the following claims.

What is claimed is:

1. A method of equestrian training for a rider to maintain a proper riding position on an English saddle having a pommel, a seat, flaps, a girth, stirrup leathers and stirrup irons, said method comprising the steps of:

mounting the saddle upon the back of a horse;

positioning a rider upon the saddle with the rider's legs boots properly positioned for the physique of the rider and horse and said step of maintaining the stirrups in a lateral and longitudinally correct position comprising securing a band around the girth of the saddle and through the stirrup irons, on each side of the saddle, so the stirrup irons are correctly positioned and fixed with respect to the specific ride and horse with the rider's feet properly positioned in the stirrups;

adjustably positioning the stirrups of the saddle at both a correct lateral and longitudinal position, fore and aft, with respect to the side of the horse, for a specific horse and rider; and maintaining the stirrups in a lateral and longitudinally correct position during a rider training session until the rider acquires a habit of correct stirrup and leg position for the rider and horse.

2. A method for equestrian training for a rider to maintain a proper riding position on an English saddle as defined in claim 1 wherein said step of securing comprises:

For each stirrup iron, positioning a strap, having a central section and a first end section with a loop Velcro strip on one side of the strap and a second end section with a hook Velcro strip on the other side of the strip, with the central section beneath the girth of the saddle;

passing the first end section with the loop Velcro strip through the stirrup iron;

passing the second end section with the hook Velcro strip through the stirrup iron; and securely joining the hook Velcro strip to the loop Velcro strip to maintain the stirrup irons in a correct position with respect to the girth of the saddle for a specific rider and horse.

3. A method for equestrian training for a rider to maintain a proper riding position on an English saddle as defined in claim 2 and further comprising the steps of:

observing the rider and horse during a walking and cantering gate; and adjusting the Velcro strips to accommodate minor variations from proper boot and leg position for the particular horse and rider.

4. A method for equestrian training for a rider to maintain a proper riding position on a English saddle having a pommel, a seat, flaps, a girth, stirrup leathers and stirrup irons, said method comprising the steps of:

mounting the saddle upon the back of a horse;

positioning a rider upon the saddle with the rider's legs and boots properly positioned for the physique of the rider and horse with the ride's feet properly positioned in the stirrups;

adjustably positioning the stirrups of the saddle at both a correct lateral and longitudinal position, fore and aft, with respect to the side of the horse, for a specific horse and rider;

maintaining the stirrups in a lateral and longitudinally correct position during a rider training session until the rider acquires a habit of correct stirrup and leg position for the rider, said step of maintaining the stirrups in a laterally and longitudinally correct position comprising securing a band around the girth of the saddle and around the stirrup leather, on each side of the saddle, so the stirrup irons are correctly positioned and fixed with respect to the specific rider and horse.

5. A method for equestrian training for a rider to maintain a proper riding position on an English saddle as defined in claim 4 wherein said step of securing comprises:

positioning a strap, having a central section and a first end section with a loop Velcro strip on one side of the strap and a second end section with a hook Velcro strip on the other side of the strip, with the central section beneath the girth of the saddle;

passing the first end section with the loop Velcro strip around the stirrup leather adjacent the stirrup iron;

passing the second end section with the male Velcro strip through the stirrup leather adjacent the stirrup iron; and securely joining the male Velcro strip to the female Velcro strip to maintain the stirrup leathers and stirrup irons in a correct position for a specific horse and rider.

6. A method for equestrian training for a rider to maintain a proper riding position on an English saddle as defined in claim 5 and further comprising the steps of:

observing the rider and horse during a walking and cantering gate; and adjusting the Velcro strips to accommodate minor variations from proper boot and leg position for the particular horse and rider.

* * * * *